Nov. 5, 1963
J. E. GALAJDA, JR
3,109,913
ELECTRICALLY HEATED MIXING SERVICE
Filed Sept. 2, 1960
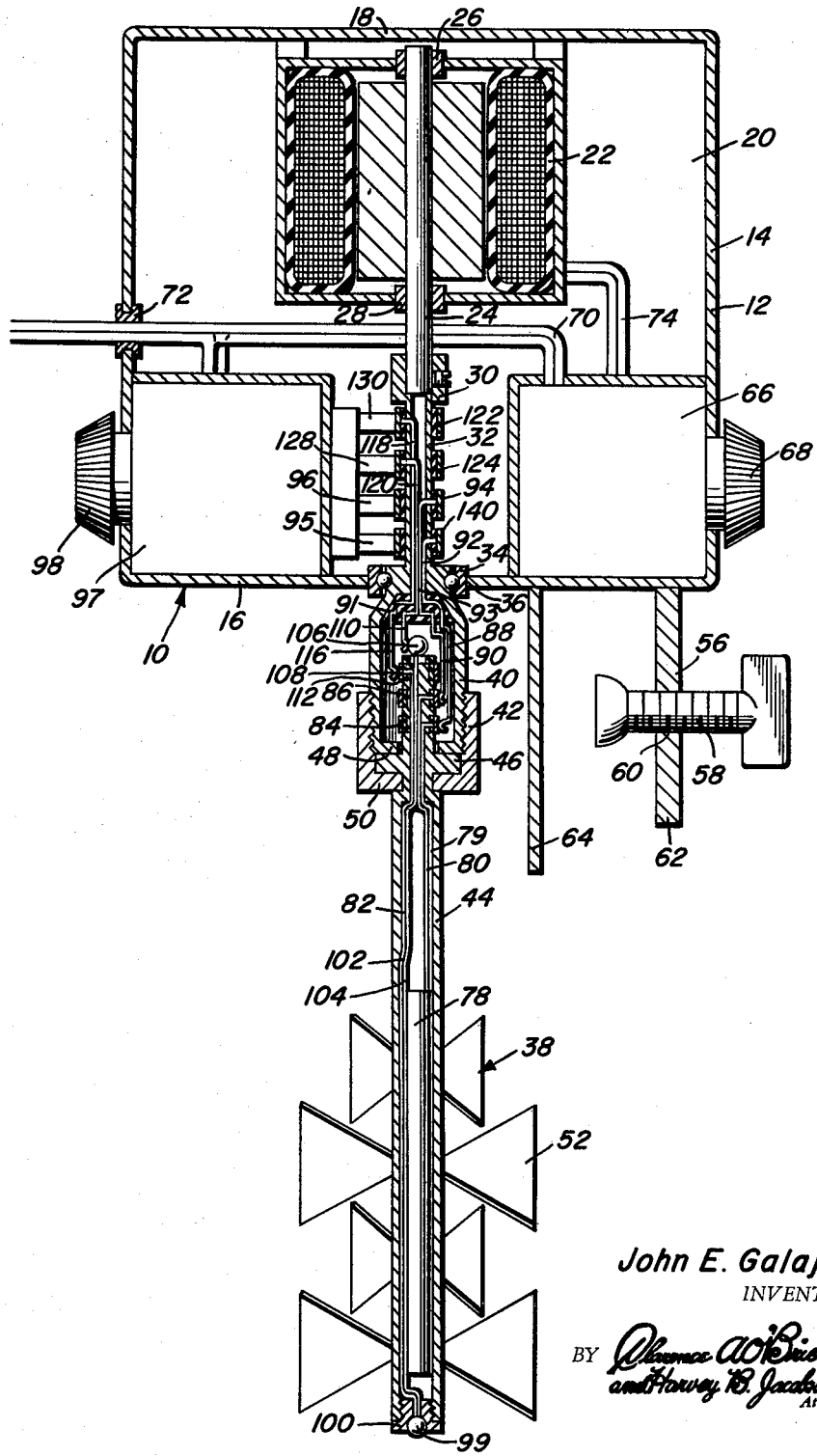
John E. Galajda, Jr.
INVENTOR.
BY
Attorneys

United States Patent Office 3,109,913
Patented Nov. 5, 1963

3,109,913
ELECTRICALLY HEATED MIXING DEVICE
John E. Galajda, Jr., North Ridgeville, Ohio
(3272 E. 5th Ave., Columbus, Ohio)
Filed Sept. 2, 1960, Ser. No. 53,646
6 Claims. (Cl. 219—41)

This invention relates generally to mixers, and more particularly to a mixer providing the option of heating while mixing.

There have been numerous mixers proposed and constructed. Ordinarily, a mixer is capable of only the single function of mixing. There are times when it would be much more advantageous to be able to heat the substance while it is being mixed. Laboratory techniques often require a separate heater on the exterior of a vessel, for example, beneath the vessel or on the sides thereof, while mixing the contents of the vessel. This necessarily supplies the heat from the outside surface of the liquid or other fluid substance.

Briefly, a heater-mixer in accordance with the invention combines a heating function with a mixing function and applies the heat through the agitator blades of the mixer and/or through the agitator blade supporting shaft. The result obtained is that the substance being mixed has heat applied thereto in a much more copious surface area, which would be calculated as all of the substance which flows across the blades and shaft of the mixer. Furthermore, the heat is applied at any point in the fluent substance by simply moving the vessel and/or the mixer to the desired place in the vessel.

A practical advantage, apart from improved mixing and much more uniform heating, is found in the omission of a separate heater. Instead, the heat is applied to the fluent substance through the same instrumentality that is used for mixing.

Although laboratory techniques have been suggested above, it is to be clearly understood that the principles of the invention are applicable in connection with numerous uses of mixers. The housewife will find the mixer in accordance with the invention to be advantageous as a utensil. The mixer has commercial and industrial application as well as laboratory use.

These, together with other objects and advantages which will become subsequently apparent, reside in the details of construction and operation as more fully hereinafter described and claimed, reference being had to the accompanying drawings forming a part hereof, wherein like numerals refer to like parts throughout, and in which:

The FIGURE is a longitudinal sectional view of a mixer in accordance with the invention.

In the accompanying drawing is a mixer 10 which exemplifies the principles of the invention. It is to be understood that the configuration of housing 12 may be varied, depending on the particular intended field of use of mixer 10. Housing 12 is formed by a plurality of walls, including side wall 14, which may be cylindrical or multisided, a bottom wall 16 and a top wall 18, all joined to form and enclose the cavity 20. The cavity houses a conventional electric motor 22 which is attached to top wall 18 and which has shaft 24 extending therefrom. The shaft 24 is the power output shaft and is mounted for rotation in suitable bearings 26 and 28 which are only diagrammatically represented.

Coupling 30 is joined to shaft 24 at one end of the shaft, and has a hollow spindle 32 connected with it. The hollow spindle is mounted for rotation in an anti-friction thrust bearing 34 carried in an opening 36 in wall 16. The rotor 38 of the mixer is attached to the part of spindle 32 which projects to the exterior of housing 12, this part 40 of the hollow spindle 32 being enlarged to accommodate a slip ring assembly which will be further described subsequently. Coupling 42 comprising an internally threaded socket, is threaded onto spindle part 40 and separably attaches the hollow shaft 44 of the agitator 38 to the spindle part 40. The hollow shaft has a collar 46 adjacent its upper end which is detachably fitted between adjacent walls 48 and 50 of spindle part 40 and coupling 42 respectively. The lower part of hollow shaft 44 has a plurality of agitator blades 52 fixed thereto, and blades 52 and hollow shaft 44 are made of heat conductive material, for example, most suitable metals. It is now evident that shaft 44 may be removed and replaced by using coupling 42 as a means for separably attaching the rotor 38 to spindle 32.

Clamp 56 is connected to housing 12 and comprises a setscrew 58 threaded in a tapped opening 60 formed in bracket 62. The bracket is fixed to the bottom wall of housing 12 and is located adjacent to a fixed plate 64 which is also secured to the wall 16. Clamp 56 facilitates holding mixer 10 on the side wall of a vessel of any type, not shown, but which side wall is received between the fixed plate 64 and the clamp 56 although the clamp 56 is usable at the option of the user.

Electric motor 22 has a motor speed control 66 which is conventional and has an adjustment knob 68 connected thereto. Any suitable means may be used for attaching the motor speed control 66 in housing 12. Electrical conductors 70 are passed through a grommet 72 in the side wall 14 of housing 12, and they are operatively attached to the speed control 66. The electrical conductors are adapted to be connected with a source of available electrical potential. Conductors 74 extend from speed control 66 and are operatively connected with motor 22, thereby placing the motor under the control of the speed control 66.

The heating section of mixer 10 is considered to be important in providing a mixer which has functional advantages over previous mixers. The heater section includes an electric heating element 78 disposed in hollow shaft 44. Although the heating element may be electrically insulated from the side wall of shaft 44, the heating element is in heat exchange relationship with shaft 44, and consequently with agitator blades 52. Element 78 is merely a commercially available resistance heater, and it has a pair of electric conductors 79 and 80 attached thereto and extending upwardly through the cavity 82 of hollow shaft 44. These conductors terminate at and are secured to the insulated slip rings 84 and 86 attached to the upper part of shaft 44 that is disposed in part 40 of spindle 32. The slip rings 84 and 86 are electrically insulated from shaft 44 by means of nonconductive rings on which the slip rings are adhered. Two brushes 88 and 90, for example, spring fingers, are mechanically secured to an insulating block 91 which is fixed within part 40. Electrical conductors 92 and 93 are secured to brushes 88 and 90 and are passed through a portion of hollow spindle 32 and are mechanically secured to slip rings 140 and 94 attached to insulating rings that are fixed to the spindle 32 within housing 12. Brushes 95 and 96 are in engagement with the surfaces of slip rings 140 and 94, and the brushes are operatively connected with an automatic temperature controller 97 that is disposed in housing 12 and which has an adjustment knob 98 accessible from the exterior of housing 12. Electrical potential is obtained from conductors 70, a connection being made between temperature controller 97 and these conductors. Current flows through the controller 97 and the described slip ring assemblies to the electric heating element 78.

There are means for regulating the heat output of heating element 78. These means preferably consist of a small thermostatic element 99, for example, a thermistor or thermocouple, etc. The heat sensitive element 99 is mounted in a plug 100 at the lower extremity of hollow shaft 44, which plug also closes the latter, and conductors 102 and 104 extend therefrom and are connected, respectively, with conductive ball 106 and a top slip ring 108. The conductive ball is mounted on an insulator at the upper extremity of shaft 44 and is contacted by a brush 110. Conductor 102 is secured to slip ring 112 which is fixed to an insulating ring, and the ring is attached to shaft 44 adjacent to slip ring 86. Brush 116 is in contact with slip ring 112, and the brushes 116 and 110 are secured to insulating block 91. Conductors 118 and 120 are attached to the brushes 116 and 110, and they are also attached to slip rings 122 and 124 that are secured to insulating rings which are fixed to spindle 32. Brushes 128 and 130 are connected with the temperature controller 97, and they are in engagement with the slip rings 124 and 122. The connection between brushes 128 and 130 and the automatic temperature controller 97 is not shown because this is conventional, i.e., actuation of temperature controller 97 in accordance with small changes in electrical voltages at the sensing element 99.

The actual use of mixer 10 is the same as any ordinary mixer in that no special mixing action is alleged insofar as the agitator blades 52 are concerned. However, the mixing action is improved by the application of heat to the fluent substance and through the agitator blades and shaft.

Although in the embodiment illustrated the agitating elements and the shaft 44 are depicted as vanes or blades 52 it should be understood that various other types of agitating means may also be employed.

Further, for some uses, the heat sensing device 99 etc. may be omitted while for other purposes the heat control 97 could likewise be omitted.

Still further other types of rotating heaters besides that specifically illustrated may me employed.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. A combined electric mixer and heater comprising an electric motor, a hollow agitator shaft of uniform external diameter having an agitator means secured to the exterior surface thereof in good heat exchange relation with said shaft, means connecting said shaft to said motor for rotation thereby, an electric heating element disposed within said hollow shaft and having good heat exchange relation with said shaft and said agitating means, means for supplying electric current to said heating element, a thermal sensing element disposed in said shaft, means operatively connecting said element to said heating element current supply means for controlling the heat output of said heating element.

2. The combination of claim 1 including a closure plug for the lower end of said hollow shaft, said thermal sensing element being carried by said plug.

3. The combination of claim 2 wherein said connecting means comprises a hollow spindle secured to said motor and attached to and communicating with said hollow shaft, slip rings on said spindle, conductors in said shaft and spindle connected to said slip rings and to said thermal sensing element, means electrically connecting said slip rings to said current supplying means for controlling the latter.

4. A combined electric mixer and heater comprising an electric motor, a hollow agitator shaft of uniform external diameter having an agitator means secured to the exterior surface thereof in good heat exchange relation with said shaft, means connecting said shaft to said motor for rotation thereby, an electric heating element disposed within said hollow shaft and having good heat exchange relation with said shaft and said agitating means, means for supplying electric current to said heating element, a housing, said electric motor being mounted in said housing, motor and heater control means mounted in said housing and respectively connected to and controlling operation of said motor and heating element and each connected to a source of electric current, manually operable control members disposed upon the exterior of said housing and each connected to one of said control means, said shaft being disposed entirely upon the exterior of said housing, said connecting means comprising a hollow spindle detachably coupled to said shaft and communicating with the interior of the latter, said spindle extending through a wall of said housing and being journaled in the latter.

5. The combination of claim 4 including slip rings on said spindle, means connecting said slip rings to said heating element control means and to said heating element source of electric current, conductors within said shaft and spindle connected to said heating element and to some of said slip rings.

6. The combination of claim 5 including a thermal sensing element carried by said shaft, further conductors in said spindle and shaft and connected to said thermal sensing element and to other of said slip rings.

References Cited in the file of this patent

UNITED STATES PATENTS

| 1,692,270 | Jensen | Nov. 20, 1928 |
| 1,845,692 | Willat et al. | Feb. 16, 1932 |
| 2,060,378 | Meek | Nov. 10, 1936 |
| 2,175,912 | Petrich | Oct. 10, 1939 |
| 2,778,922 | Birkner | Jan. 22, 1957 |
| 2,835,480 | Perez | May 20, 1958 |

FOREIGN PATENTS

| 181,764 | Germany | Jan. 21, 1907 |